United States Patent [19]

Makino et al.

[11] 3,928,836

[45] Dec. 23, 1975

[54] MAGNETORESISTIVE ELEMENT

[75] Inventors: Yoshimi Makino, Fujisawa; Tsutomu Okamoto, Yokohama; Iwao Kamiya, Chigasaki, all of Japan

[73] Assignee: Sony Corporation, Tokyo, Japan

[22] Filed: July 10, 1974

[21] Appl. No.: 487,282

[30] Foreign Application Priority Data

July 13, 1973 Japan .............................. 48-97655

[52] U.S. Cl................. 338/32 R; 324/46; 338/285; 338/287; 338/307; 338/308; 338/325; 338/330; 340/174 EB

[51] Int. Cl.²........................................ H01C 7/16

[58] Field of Search........ 338/32 R, 32 H, 283–285, 338/287, 279–280, 293, 295, 307–309, 325, 330; 323/94 H; 324/45, 46; 252/512–513, 518–519; 340/174 EB

[56] References Cited

UNITED STATES PATENTS

| | | | |
|---|---|---|---|
| 1,093,968 | 4/1914 | Bicknell | 338/325 X |
| 2,860,061 | 12/1958 | Risk | 338/292 X |
| 3,003,105 | 10/1961 | Kostyshyn | 324/45 |
| 3,016,507 | 1/1962 | Grant et al. | 338/32 R |
| 3,716,781 | 2/1973 | Almasi et al. | 378/32 R |

*Primary Examiner*—C. L. Albritton
*Attorney, Agent, or Firm*—Hill, Gross, Simpson, Van Santen, Steadman, Chiara & Simpson

[57] ABSTRACT

A magnetoresistive element of an insulating substrate, a first current conducting ferromagnetic metal film strip on said substrate and having a current carrying ability predominantly in one direction, a second current carrying ferromagnetic metal film strip on the substrate having a current carrying ability predominantly in a direction substantially perpendicular to the aforementioned direction, the ends of said strips being connected together, with a current input terminal connected to the opposed ends of the strips and an output terminal connected to the junction between the two strips.

6 Claims, 8 Drawing Figures

MAGNETORESISTIVE ELEMENT

BACKGROUND OF THE INVENTION

1. Field of the Invention

This invention relates to magnetoresistive elements, and more particularly to a magnetoresistive element suitable for detecting the direction of a magnetic field.

2. Description of the Prior Art

It is common practice to detect angular positions of a rotor of a brushless electric motor by means of a magnetoelectric transducer in order to control the currents flowing into the stator coil of the brushless motor. The magneto-electric transducer may, for example, be a semiconductor Hall device, a semiconductor magnetoresistive element, a planar Hall element, or a ferromagnetic magnetoresistive element.

The temperature characteristics of a semiconductor transducer are undesirable, since the number and the mobility of the charge carriers vary widely with temperature. A temperature compensating device is accordingly required in the use of such semiconductor transducers. Moreover, the output of the semiconductor transducer varies with the intensity of the magnetic field. Consequently, when the semiconductive transducer is used as a switching element for detecting the direction of the magnetic field, for example, in a brushless motor, additional circuitry must be employed to improve the accuracy and effect a limiting operation. Consequently, the circuits involved for employing semiconductive transducers are expensive.

The ferromagnetic transducer, on the other hand, has a desirable temperature characteristic because the resistivity of the ferromagnetic transducer varies only slightly with temperature. Moreover, since the ferromagnetic transducer can be saturated with a magnetic field, it can effect a self-limiting operation so as to be insensitive to variation of the intensity of the magnetic field. Consequently, the ferromagnetic transducer is more advantageous than a semiconductive transducer for use as a switching element for direction of the magnetic field. However, a planar Hall element has the disadvantage that its output voltage is small and that it requires the use of a high gain amplifier. Moreover, a conventional magnetoresistive element having two terminals has the disadvantage that the unbalanced voltage at no magnetic field is several orders of magnitude as high as the output voltage, although the output voltage is considerably high, and that the drift due to variations in temperature must be compensated.

U.S. Pat. No. 3,405,355 to Hebbert discloses a magnetometer employing thin film magnetic films having magnetoresistive properties. The relationship between the resistivity of the material and the angle of rotation of the magnetization in the film is used to measure external magnetic fields. When a biasing field is applied to the magnetoresistive films, fields of high intensity can be measured.

SUMMARY OF THE INVENTION

The magnetoresistive element of the present invention has the advantages of the planar Hall element and those of the conventional magnetoresistive element, without the disadvantages mentioned above. The magnetoresistive element of the present invention is capable of generating a large change in output voltage with changes in direction of a magnetic field. The element of the present invention is capable of readily performing a switching function, and therefore is useful for detecting angular positions of a rotor of a brushless motor.

In accordance with the present invention, we provide a magnetoresistive element which comprises an insulating substrate, a first current conducting ferro-magnetic metal film strip on the substrate having a current carrying ability predominantly in one direction, a second current carrying ferro-magnetic metal film strip on the substrate having a current carrying ability predominantly in a direction substantially perpendicular to the aforementioned direction, with the ends of the strips being connected together, and a current input terminal connected to the opposed ends of the strips, and an output terminal connected to the junction between the two strips. The two strips may be located on the same or on opposite surfaces of the substrate.

BRIEF DESCRIPTION OF THE DRAWINGS

FIG. 7 is a cross sectional view taken substantially along the line VII—VII of FIG. 5; and FIG. 8 is the equivalent circuit diagram showing three magnetoresistive elements connected in parallel with each other.

DESCRIPTION OF THE PREFERRED EMBODIMENTS

Figure 1:
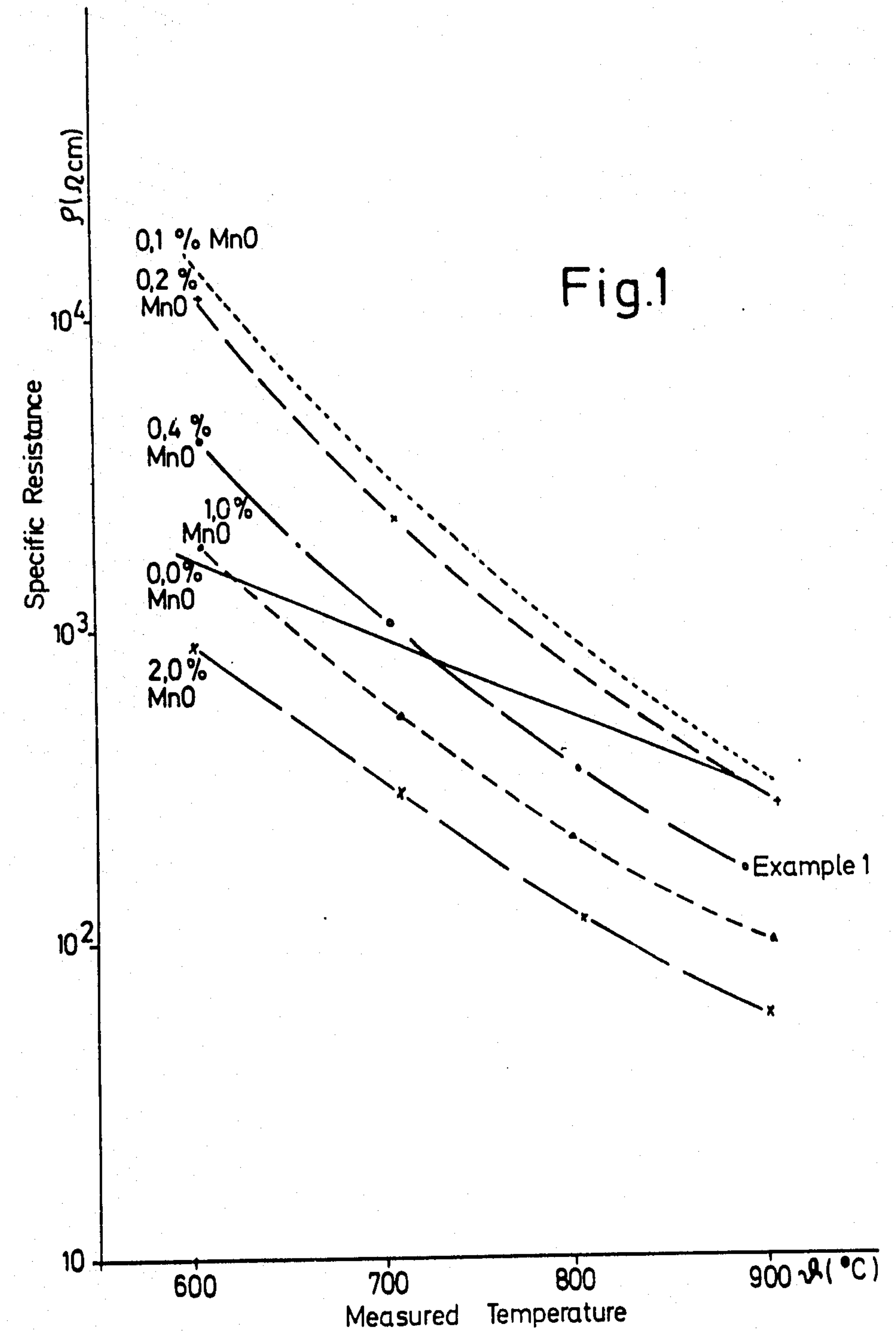
FIG. 1 is a schematic view illustrating the principles of operation of a magnetoresistive element according to this invention.

Referring to FIG. 1, there is shown a magnetoresistive element 1 which comprises a pair of strips A and B formed of a ferromagnetic material having a magnetoresistive effect. The longitudinal direction of the strip A is perpendicular to that of strip B. The strips A and B are connected electrically to each other in series. Current supply terminals 2 and 3 are connected to the opposed ends of the strips A and B. An output terminal 4 is connected to the junction between the strips A and B. A power source 5 is connected between the current supply terminals 2 and 3. One current supply terminal 3 is connected to ground potential. Thus, a sensing circuit 6 for magnetic fields is obtained.

A magnetic field H sufficient to saturate the strips A and B formed of ferromagnetic material, is applied to the strips A and B at an angle $\theta$ to the longitudinal direction of the strip A. Generally, the resistance of a saturated ferromagnetic material is anisotropic. Resistances $\rho_A$ and $\rho_B$ of the strips A and B will be represented by the Voigt-Thomson's formula:

$$\rho_A(\theta) = \rho \quad \sin^2\theta + \rho \quad \cos^2\theta \qquad (1)$$

$$\rho_B(\theta) = \rho \quad \cos^2\theta + \rho \quad \sin^2\theta \qquad (2)$$

where $\rho \perp$ is a resistance of the ferromagnetic strip A or B when saturated with a magnetic field perpendicular to the longitudinal direction of the ferromagnetic strip A or B, and $\rho \parallel$ a resistance of the ferromagnetic strip when saturated with a magnetic field parallel with the longitudinal direction of the ferromagnetic strip A or B.

Figure 2:
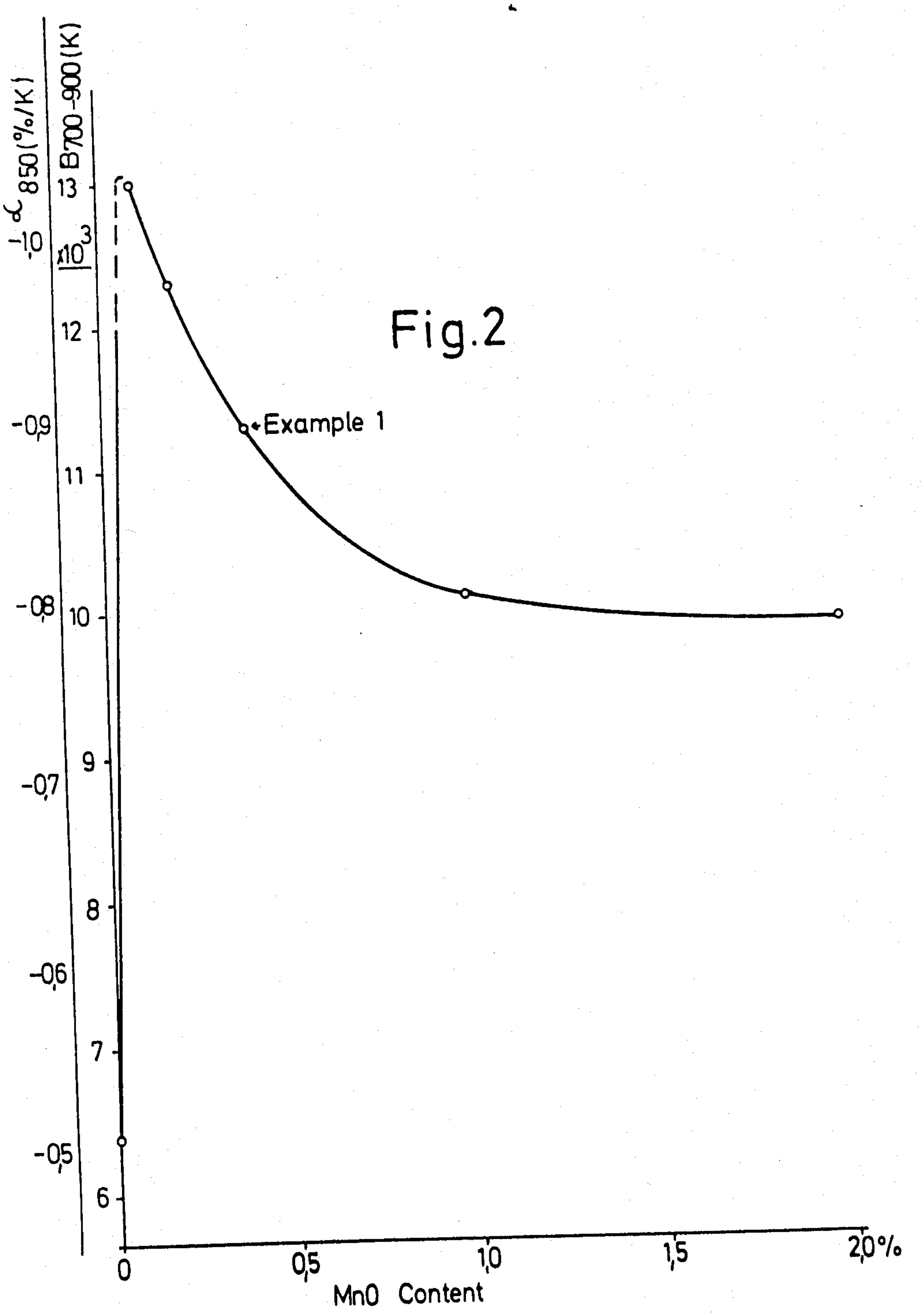
FIG. 2 is the equivalent circuit diagram of FIG. 1.

FIG. 2 shows a circuit equivalent to FIG. 1. A voltage $V(\theta)$ at the output terminal 4 will be represented by $$V(\theta) = \frac{\rho_B(\theta)}{\rho_A(\theta) + \rho_B(\theta)} \cdot V_o \quad (3)$$

where $V_o$ is the voltage of the power source 5.

By substitution of the equations (1) and (2), $$V(\theta) = \frac{V_o}{2} - \frac{\Delta\rho \cos 2\theta}{2(\rho\parallel + \rho\perp)} \cdot V_o \quad (4)$$

where $\Delta\rho = \rho\parallel - \rho\perp$

In the equation (4), the first term represents a standard voltage $$V_s \left(V_s = \frac{V_o}{2}\right),$$

and the second term a change of the output voltage $\Delta V(\theta)$.

The second term $\Delta V(\theta)$ is converted into $$\Delta V(\theta) = -\frac{\Delta\rho}{4\rho_o} \cdot \cos 2\theta \cdot V_o \quad (5)$$

where $2\rho_0 = \rho\parallel + \rho\perp$ and $\rho_0$ is the resistance of the ferromagnetic strip A or B when no magnetic field is applied to the ferromagnetic strip A or B.

The absolute value of the change of the output voltage is maximum at angles 0°, 90°, 180° and 270°. A switching operation can be most suitably effected when two kinds of magnetic fields at the angles 0° and 90° are applied to the ferromagnetic strips A and B, because signs of the changes $\Delta V(\theta)$ at the angles 0° and 90° are opposite to each other.

As apparent from the equation (5), the change of the output voltage is independent of the intensity of the magnetic field H, while it varies with the direction of the magnetic field H. It is apparent that the intensity of the magnetic field H should be sufficient to saturate the ferromagnetic strips A and B.

Moreover, as apparent from the equation (5), the magnetoresistance element 1 is required to be formed of ferromagnetic material with a large $\Delta\rho/\rho_o$, for suitable increase of the change of the output voltage.

The following ferromagnetic metals are known for which $\Delta\rho/\rho_o$ is more than 2% at room temperature:

| Metal | $\Delta\rho/\rho_o$(%) | Metal | $\Delta\rho/\rho_o$(%) |
|---|---|---|---|
| Ni | 2.66 | 76Ni-24Fe | 3.79 |
| 80Ni-20Co | 6.48 | 70Ni-30Fe | 2.50 |
| 90Ni-10Co | 5.02 | 90Ni-10Cu | 2.60 |
| 70Ni-30Co | 5.53 | 83Ni-17Pd | 2.32 |
| 60Ni-40Co | 5.83 | 69Ni-31Pd | 2.03 |
| 50Ni-50Co | 5.05 | 97Ni-3Sn | 2.28 |
| 40Ni-60Co | 4.30 | 99Ni-1Al | 2.40 |
| 30Ni-70Co | 3.40 | 98Ni-2Al | 2.18 |
| 90Ni-10Fe | 4.60 | 98Ni-2Mn | 2.93 |
| 80Ni-20Fe | 3.55 | 94Ni-6Mn | 2.48 |
| | | 95Ni-5Zn | 2.60 |

Any one of the above ferromagnetic metals can be used as the material of the magnetoresistive element 1 according to this invention. Among the above ferromagnetic metals, $\Delta\rho/\rho_o$ for 80Ni-20Co alloy is at a maximum (6.48%). Compared with a Ni-Fe alloy, the 80Ni-20Co alloy is very acid resistant, inexpensive and solderable. Therefore, the 80Ni-20Co alloy is the practical material most suitable for the magnetoresistive element.

Another factor for the change of the output voltage is the voltage $V_o$ of the power supply 5. It is possible to increase the change of the output voltage with the voltage $V_o$, as by the selection of a suitable ferromagnetic metal. However, it is not desirable that the voltage of the power supply 5 be increased, since the consumption of the power in the magnetoresistive element, increases with the voltage $V_o$ which generates a large amount of heat. The consumed power W is proportional to the square of the voltage $V_o$ and inversely proportional to the resistance $$\rho_o \quad W = \left(\frac{V_o^2}{2\rho_o}\right).$$

Accordingly, the change of the output voltage can be increased in such a manner that the resistance $\rho_o$ of the magnetoresistive element 1 is increased concurrently with the voltage $V_o$.

The resistance $\rho_o$ of the magnetoresistive element 1 can be easily increased by reducing the widths of the strips A and B. Consequently, the change of the output voltage of the magnetoresistive element 1 can be made larger than that of the conventional planar Hall element.

Although the resistances $\rho\parallel$ and $\rho\perp$ vary with temperature, $\Delta\rho$ and $\rho_o$ are little affected by temperature, since the resistances $\rho\parallel$ and $\rho\perp$ simultaneously vary. Consequently, the change of the output voltage $\Delta V(\theta)$ is little affected by temperature.

The magnetoresistive element 1 has three terminals. One of the three terminals is connected to the ground as a common terminal, Consequently, any neighboring circuit, for example, a power supply circuit, can be simplified.

Next, one embodiment of the magnetoresistive element 1 will be described with reference to FIG. 3.

By a vacuum evaporation method, a thin film of 80Ni-20Co alloy material is deposited on an insulating base plate 7 such as a glass slide or a photographic dry plate, to a depth of approximately 600 to 1,000 A. Then, the thin film is etched so as to form the ferromagnetic strips A and B in zig-zag or in strips together with the terminals 2, 3 and 4. The ferromagnetic strips A and B comprise a plurality of main current paths 8 and 9, and associated connecting portions 10 and 11, respectively. The main current paths 8 and 9 are substantially perpendicular to each other. The last path *8a* of the main current paths 8 is connected to the first path *9a* of the main current paths 9 in series. The connecting point of the last path *8a* and the first path *9a* is connected to the terminal 4.

By such an arrangement, the whole length, and therefore, the resistance, of the magnetoresistive element 1 can be increased. Moreover, the size of the magnetoresistive element 1 can be minimized. Consequently, the consumed power can be reduced and the change of the output voltage can be increased.

Next, characteristics of the magnetoresistive element 1 will be described.

The total resistance 2 $\rho_o$ of the magnetoresistive element 1 is 2.5 kilo-ohms at a thickness of 600 A for the ferromagnetic strips A and B, and an output voltage of 160 millivolts is generated for a voltage of 8 volts of the power source 5. In this case, the intensity of the saturation magnetic field is more than 50 oersteds and the consumed power is about 26 milliwatts. Thus, the intensity of the magnetic field to operate the magnetoresistive element 1 can be low, and the consumed power will be small. At the same thickness of the ferromagnetic strips A and B, an output voltage 240 millivolts is generated and the consumed power is about 58 milliwatts, for a voltage of 12 volts for the power source 5.

At a thickness of 1000 A for the ferromagnetic strips A and B, the total resistance 2 $\rho_o$ of the magnetoresistive element 1 is 1.4 kilo-ohms, and an output voltage of 180 millivolts is generated for a voltage of 8 volts for the power source 5, where the intensity of the saturation magnetic field is more than 50 oersteds and the consumed power is about 47 millivolts. At the same thickness of the ferromagnetic strips A and B, an output voltage of 270 millivolts is generated and the consumed power is about 103 milliwatts, for the voltage of 12 volts for the power source 5.

Figure 4:
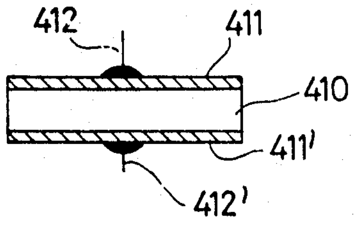
FIG. 4 is a graph illustrating the relationship between change of output voltage of the magnetoresistive element and the direction of magnetic field applied to the element.

FIG. 4 shows the relationship between the change of the output voltage of the magnetoresistive element 1 with a film thickness of 1000 A and the direction of the magnetic field with an intensity of 3000 oersteds. The ordinate represents the change of the output voltage $\Delta V(\theta)$ and the abscissa represents the angle $\theta$. The origin of the angle $\theta$ is shifted from the representation of FIG. 1 by an angle $(\pi/4)$ (45°).

The afore-described equation (5) proved to be true, since the change of the output voltage $\Delta V(\theta)$ is in the form of a cosine wave. The changes of the output voltage $\Delta V(\theta)$ were 104 millivolts at the angle 0°, 45 millivolts at the angle 45°, −103 millivolts at the angle 90°, 0 millivolts at the angle 135°, 104 millivolts at the angle 180° and 0 millivolts at the angle 225°.

Another embodiment of the magnetoresistive element 1 will be described with reference to FIG. 5 to FIG. 7.

In this embodiment, a single ferromagnetic strip A, and the terminals 2 and 4 are deposited on the upper surface of the insulating base plate 7, while the other ferromagnetic strip B and the terminal 3 are deposited on the lower surface of the insulating base plate 7. As in the one embodiment, the main current paths 8 of the ferromagnetic strip A are perpendicular to the main current paths 9 of the ferromagnetic strip B. Moreover, annular ferromagnetic films 4*a* and 4*b* are deposited on the upper surface and the lower surface of the insulating base plate 7, respectively. The annular ferromagnetic films 4*a* and 4*b* are connected to each other through an aperture made in the insulating base plate 7 (FIG. 7). A ferromagnetic film is deposited on the surface of the aperture. The annular ferromagnetic film 4*a* connects the terminal 4 to the last main current path 8*a* of the ferromagnetic strip A. Therefore, the last main current path 8*a* of the ferromagnetic strip A is connected to the first main current path 9*a* of the ferromagnetic strip B through the annular ferromagnetic films 4*a* and 4*b*.

Figure 3:
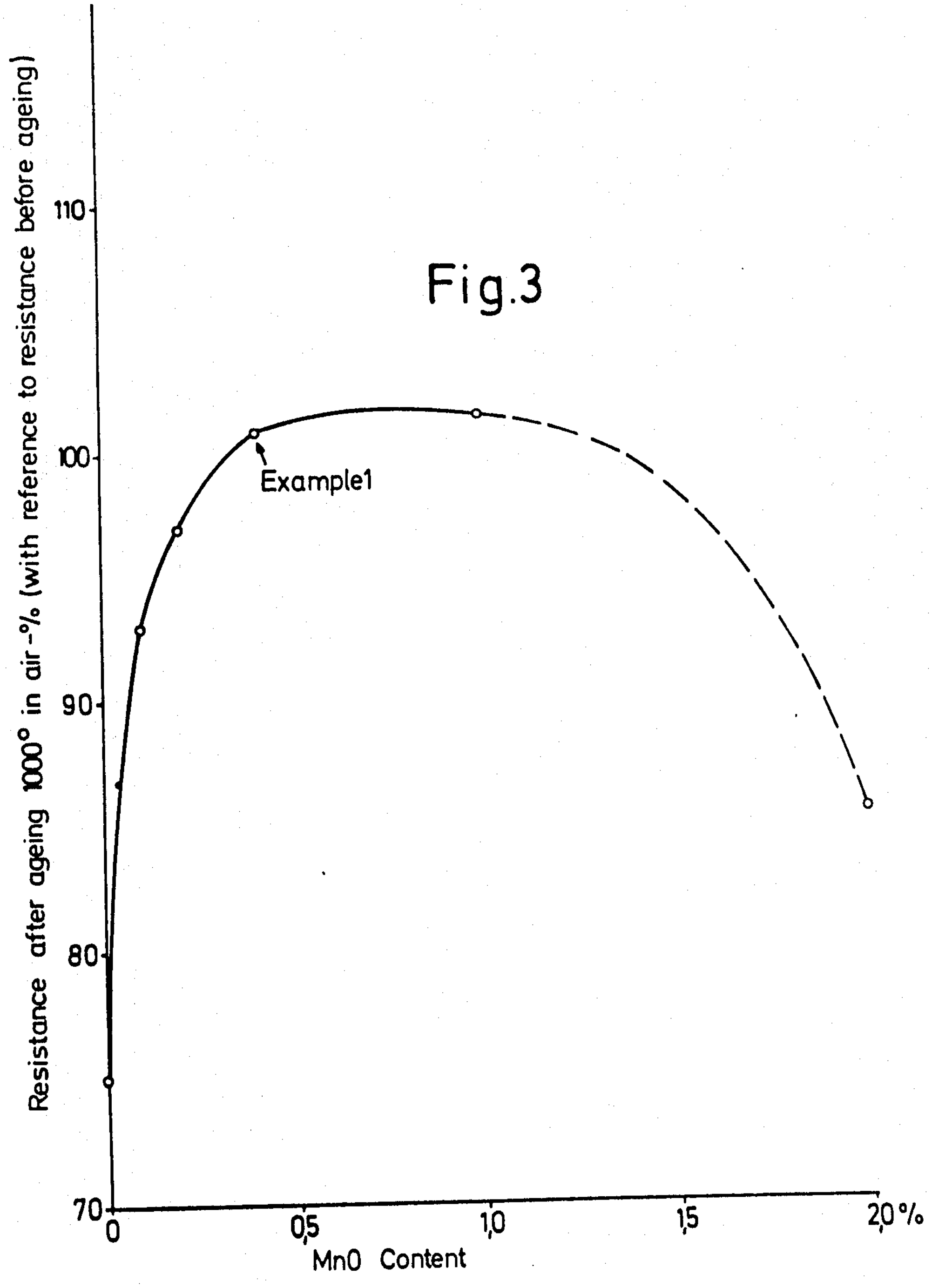
FIG. 3 is a plan view of a magnetoresistive element produced according to one embodiment of the invention.
Figure 5:
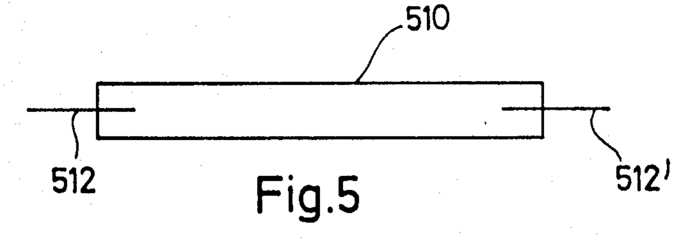
FIG. 5 is a plan view of a magnetoresistive element according to another embodiment of this invention.
Figure 6:
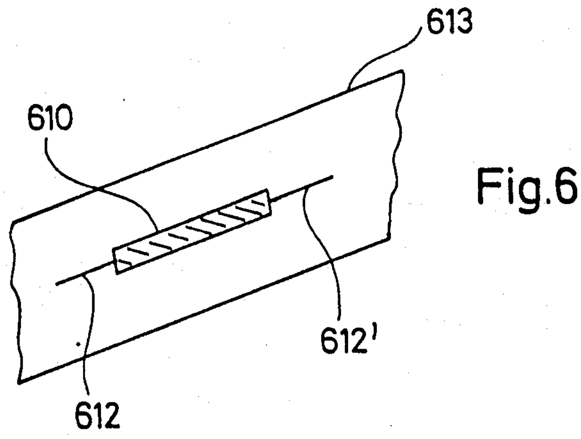
FIG. 6 is a bottom plan view of FIG. 5.
Figure 1:
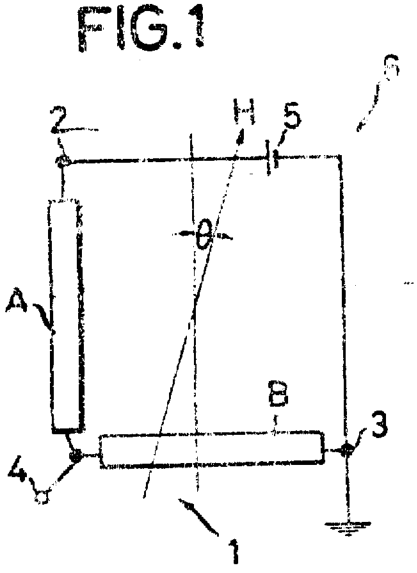
Figure 2:
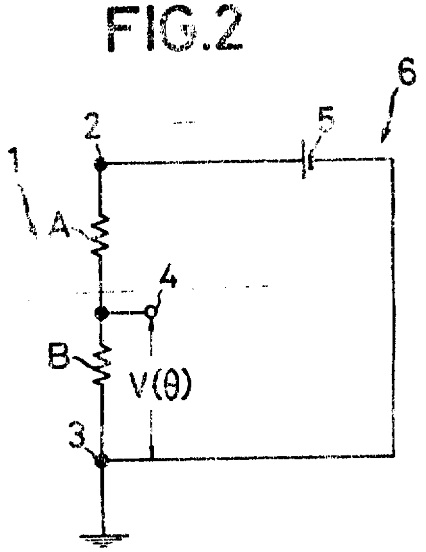
Figure 3:
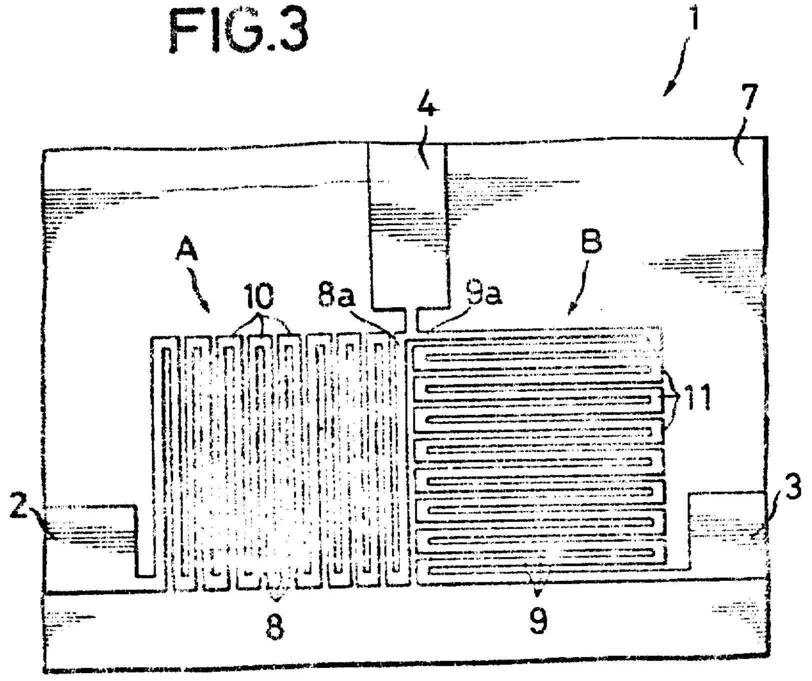
Figure 4:
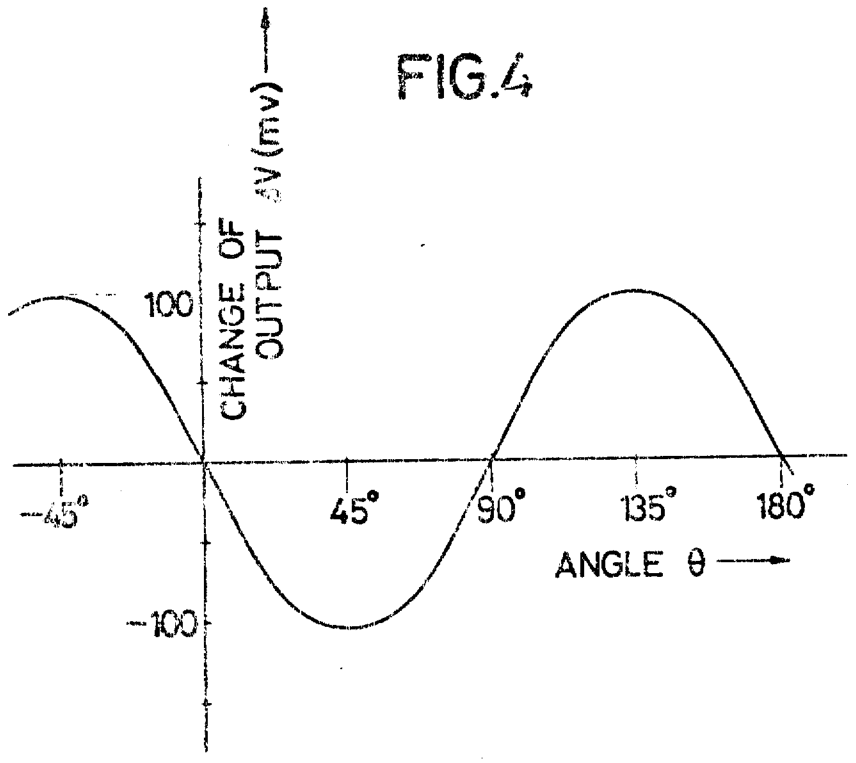
Figure 5:
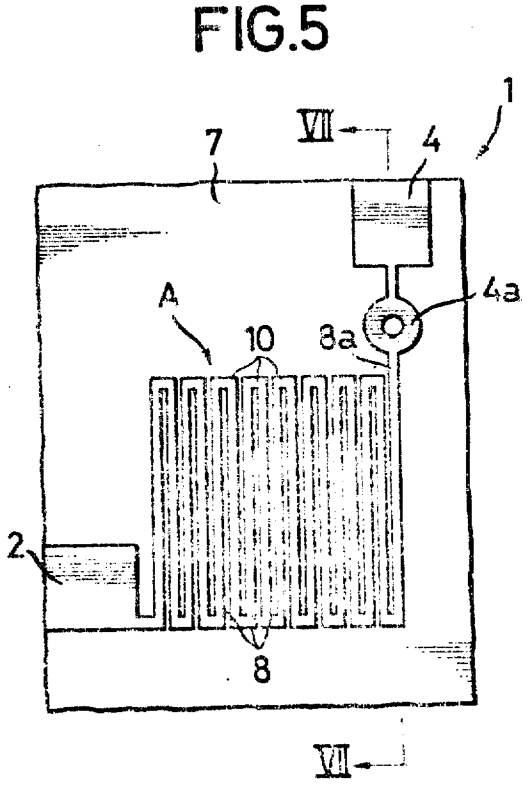

When the magnetoresistance element 1 is put in a heterogeneous magnetic field, the embodiment of FIG. 5 to FIG. 7 is more preferable than the one embodiment of FIG. 3, since the embodiment of FIG. 5 to FIG. 7 can sense the direction of the magnetic field in a more limited space than the embodiment of FIG. 3.

FIG. 8 shows a circuit equivalent to three magnetoresistive elements 1 connected in parallel with each other, in which the power source 5 is used in common. In this case, $\rho_A(\theta) + \rho_B(\theta) = \rho_\parallel + \rho_\perp = 2\,\rho_o$ and $\rho_o =$ constant. Accordingly, the three magnetoresistive elements 1 can operate independently of each other. That is one of the advantages of the magnetoresistive element according to this invention.

A plurality of the magnetoresistive elements may be connected in series with each other. Instead of the Ni-Co alloy, the strips A and B may be formed of 80Ni-20Fe alloy with a large $\Delta\rho/\rho_o$, so the strips A and B can be saturated with a magnetic field having a lower intensity.

Moreover, the main current paths of the one ferromagnetic strip may be at an angle other than 90°, for example, at 70° to 80° with the main current paths of the other ferromagnetic strip, so long as the characteristic of the magnetoresistive element 1 is not deteriorated.

Although illustrative embodiments of this invention have been described in detail herein with reference to the accompanying drawings, it is to be understood that the invention is not limited to those precise embodiments, and that various changes and modifications may be effected therein by one skilled in the art without departing from the spirit and scope of the novel concepts of this invention, as defined in the appended claims.

We claim as our invention:

1. A magnetoresistive element comprising an insulating substrate, a first current conducting ferromagnetic metal film strip on said substrate and having a current carrying ability predominantly in one direction, a second current carrying ferromagnetic metal film strip on said substrate having a current carrying ability predominantly in a direction substantially perpendicular to said one direction, first ends of said strips being connected together, a current input terminal connected to the opposite ends of said strips and an output terminal connected to the junction between the two strips.

2. The element of claim 1, in which both strips are located on the same surface of said substrate.

3. The element of claim 1, in which said strips are located on opposite surfaces of said substrate.

4. The element of claim 1, in which said first and second strips each include a plurality of parallel strips connected electrically in series.

5. The element of claim 1 in which each strip is composed of an alloy containing about 80% by weight of nickel and about 20% by weight of iron.

6. A magnetoresistive element comprising an insulating substrate, a first current conducting ferromagnetic metal film strip on said substrate and having a current carrying ability predominantly in one direction, a second current carrying ferromagnetic metal film strip on said substrate having a current carrying ability predominantly in a direction substantially perpendicular to said one direction, first ends of said strips being connected together, a current input terminal connected to the opposite ends of said strips and an output terminal connected to the junction between the two strips, wherein each strip is composed of an alloy containing about 80% by weight of nickel and about 20% by weight of cobalt.

* * * * *

UNITED STATES PATENT OFFICE

CERTIFICATE OF CORRECTION

Patent No. 3,928,836 Dated December 23, 1975

Inventor(s) Yoshimi Makino et al

It is certified that error appears in the above-identified patent and that said Letters Patent are hereby corrected as shown below:

Cancel the sheets of drawings and substitute the attached sheets.

Column 2, lines 62 and 63, change $$\rho_A(\theta) = \rho \sin^2\theta + \rho \cos^2\theta$$

$$\rho_B(\theta) = \rho \cos^2\theta + \rho \sin^2\theta$$

to $$\rho_A(\theta) = \rho_\perp \sin^2\theta + \rho_\parallel \cos^2\theta$$

$$\rho_B(\theta) = \rho_\perp \cos^2\theta + \rho_\parallel \sin^2\theta$$

UNITED STATES PATENT AND TRADEMARK OFFICE

CERTIFICATE OF CORRECTION

PATENT NO. : 3,928,836

DATED : December 23, 1975

INVENTOR(S) : Makino et al

It is certified that error appears in the above-identified patent and that said Letters Patent are hereby corrected as shown below:

Column 2, line 64, change $\rho\perp$ to $\rho_{\perp}$ line 66, change $\rho\parallel$ to $\rho_{\parallel}$ Column 4, change the equation at line 20 from $$\rho_o W = (\frac{V_o^2}{2\rho_o}).$$

to $$\rho_o (W = \frac{V_o^2}{2\rho_o}).$$

line 38, change "45" to --0--,

FIG.6

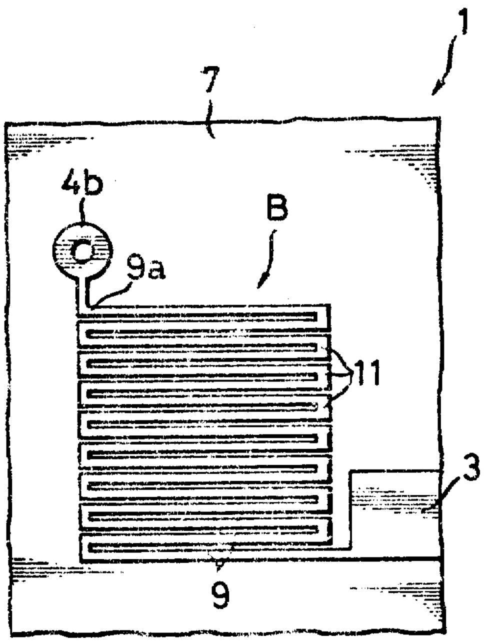

FIG.7

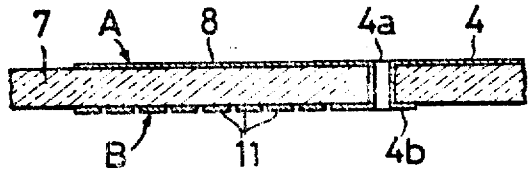

FIG.8

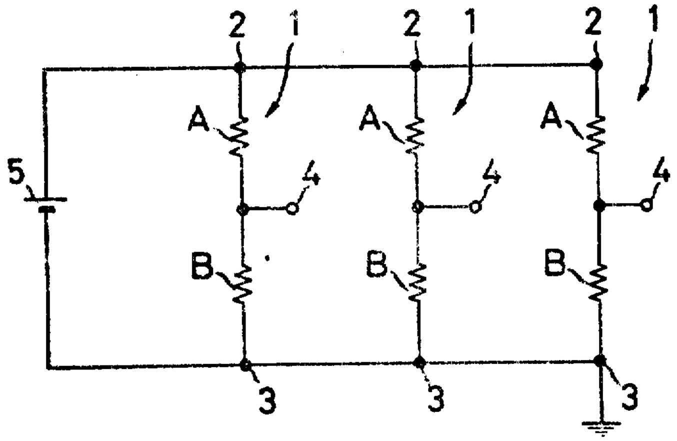

Signed and Sealed this twenty-second Day of June 1976

[SEAL]

Attest: